United States Patent [19]

Belady et al.

[11] 3,771,144

[45] Nov. 6, 1973

[54] CLOCK FOR COMPUTER PERFORMANCE MEASUREMENTS

[75] Inventors: Laszlo A. Belady, Yorktown Heights; William R. De Orazio, Briarcliff Manor; Robert W. O'Neill, South Salem, all of N.Y.

[73] Assignee: International Business Machines Corporation, Armonk, N.Y.

[22] Filed: July 24, 1972

[21] Appl. No.: 274,709

[52] U.S. Cl. .......................... 340/172.5, 235/153 A

[51] Int. Cl. .......................... G06f 11/00

[58] Field of Search .......................... 340/172.5; 235/153 A; 324/73

[56] References Cited

UNITED STATES PATENTS

| | | | |
|---|---|---|---|
| 3,320,440 | 5/1967 | Reed | 307/88.5 |
| 3,351,917 | 11/1967 | Shimabukuro | 340/172.5 |
| 3,522,597 | 8/1970 | Murphy | 340/324 |
| 3,540,003 | 11/1970 | Murphy | 340/172.5 |
| 3,599,091 | 8/1971 | Warner | 324/73 |
| 3,624,611 | 11/1971 | Wirsing | 340/172.5 |

*Primary Examiner*—Paul J. Henon

*Assistant Examiner*—James D. Thomas

*Attorney*—Roy R. Schlemmer, Jr. et al.

[57] ABSTRACT

A hardware system for timing specific operations occurring in an electronic computing system. Special purpose hardware is provided in the system which may be called into operation by suitable instructions included in the program to activate certain counters, load special registers, and appropriately increment the counters as required.

6 Claims, 5 Drawing Figures

CLOCK FOR COMPUTER PERFORMANCE MEASUREMENTS

BACKGROUND OF THE INVENTION

As electronic computers become increasingly more complex and as they are provided with hardware capable of extremely rapid operation, it is becoming increasingly more important to be able to monitor the operation of the various components of the overall system in an effort to insure that all are operating at maximum capacity. Such observation and analysis allows more efficient utilization and design of the overall system and ultimately provides the user with a maximum amount of computation per dollar of cost.

In accomplishing these results there has recently been an increasing interest in measuring a variety of time intervals associated with certain modes of operation in the computing system. A simple example is the measurement of the time spent by the central processing unit doing useful work as a fraction of the total elapsed time of the observation.

Computer systems today are capable of performing a plurality of concurrent operations. A multiplicity of data channels simultaneously performing with the CPU (or CPU's) is an example. Typically, one would want to know the fraction of time spent in concurrent operations with one, two, etc., channels operating. Another area of interest is related to the subdivision of time spent in different functional parts of the program, in particular, systems programs. Yet another example is the distribution of time for different kinds of activities at the micro-level; namely, a count of memory accesses, or even a more detailed account of memory accesses to fetch operands versus fetching instructions.

Methods of measuring may be classified into two major categories. One category of measurement is implemented purely by programs. Since most computers do not have an internal (high or low resolution) clock, which is accessible to the CPU for both storing and fetching purposes, the read out of the clock in two different instances will enable one to find elapsed time between these two points in time. The programs running on the system during measurement have to contain as many clock readings and associated operations as there are end points to intervals of interest and if one wants to change the pattern of these intervals, the program has to be rewritten correspondingly.

The other category mostly consists of hardware devices attached to the regular components of the computer system. These devices receive signals which correspond to start and stop points at intervals of interest and some logic boxes count the elapsed time under given conditions. Channel/processor overlaps are, for example, measured this way. Event counts are also extracted by external devices, for example, the number of interrupts of one kind occurring during a given day.

The software, or programming, method of timing such occurrences is thus rather cumbersome and inconvenient to use since rather extensive reprogramming is necessary in order to change what it is desired to monitor. It further interferes with the overall operation of the system in terms of taking up large numbers of machine cycles.

The hardware method outlined above is generally fixed and limited to doing a particular thing and such hardware systems utilized in the past have suffered from this general lack of flexibility. What is needed then is a more flexible system combining the aspects of the prior art software and hardware approaches towards system operation monitoring. Thus, it would be desirable to achieve the flexibility of a software monitoring system while at the same time retaining some of the advantages of the permanently attached hardware system wherein minimum program revision would be necessary to achieve said monitoring and wherein the basic hardware is permanently attached and ready to be called into service when desired.

SUUMARY AND OBJECTS OF THE INVENTION

It has now been found according to the teachings of the present invention that an improved monitoring system or counter for use in an electronic computing system may be achieved utilizing a minimum amount of additional hardware and a slightly modified programming set recognizable by the instruction decoding mechanism. This system combines the advantages of the aforementioned software and hardware monitoring systems. A high resolution clock or counter is disclosed, controlled by a pair of special START/STOP instructions as well as by the contents of a condition register. This register specifies the combinations of modes during which the clock is to run.

It is accordingly the primary object of the present invention to provide a mechanism for measuring the performance of an electronic computing system.

It is a further object of the invention to provide such a mechanism combining the advantages of prior art, hardware and software measurement systems.

It is a further object to provide such a measurement mechanism which has a relatively high degree of flexibility available to the programmer.

It is a still further object of the present invention to provide such a measurement mechanism including certain resident hardware which may be easily called into operation for efficiently performing the measurement function.

It is yet another object of the present invention to provide such a measurement mechanism which includes a minimum amount of resident special purpose hardware which is readily available to the programmer for measuring desired occurrences in the system.

Other objects, features and advantages of the system will be apparent from the following more particular description of a preferred embodiment of the invention.

DESCRIPTION OF THE PREFERRED EMBODIMENT

The objects of the present invention are accomplished in general by a timing mechanism for monitoring the occurrence of certain specified events in an electronic computing system wherein said computing system includes a main memory, a central processing unit, an instruction unit, and data channels. The timing mechanism includes a counter, means for loading said counter and means for storing the current contents of said counter in memory. The mechanism further includes a condition register, means for loading said register with data indicative of the type of occurrence it is desired to monitor and means operative under control of said condition register for incrementing said counter. Further means are provided for determining if a particular instruction appearing in said instruction register for nominally controlling said timing mechanism is, in fact, to be followed. This last means comprises a special binary code field in said condition register which may be suitably loaded by a programmer and which is compared against a similar code field in timing mechanism controlled instructions appearing in said instruction register. When a match occurs, it is indicative that, that particular instruction is to be executed.

The use of the presently disclosed timing mechanism allows programs to be initially written with many built in timing intervals which the program designers feel would be desirable at the time the programs are initially written. Then, by providing the present mechanism is the system, these built in timing intervals may be utilized for subsequent evaluations and trouble shooting at will, or may conversely be ignored. This is accomplished essentially by loading appropriate control or condition words into memory at predesignated locations whereby a proper identifying code is placed in the proper condition word field and ultimately in the condition register for identifying the various timing commands. Additionally, certain other data fields may be specified in the condition register which will specify just what occurrences are to be timed during the specified interval.

Thus, the present invention comprises a timing mechanism which essentially combines the advantages of both of the previously recited software and hardware timing systems. As stated previously, it comprises two major hardware components permanently associated with the instruction and memory units of the computer system. One component is the binary counter, preferably a high resolution one which can count a pulse arriving at the frequency of the CPU cycle. It may have as many bits as necessary to measure the longest possible interval which is believed to be involved. The second principal hardware component is the register which is referred to herein as a condition register and which contains the particular bit configuration which in turn controls both the operation or activation of the timing mechanism per se and also specifies just which events are to be timed.

Figure 1A:
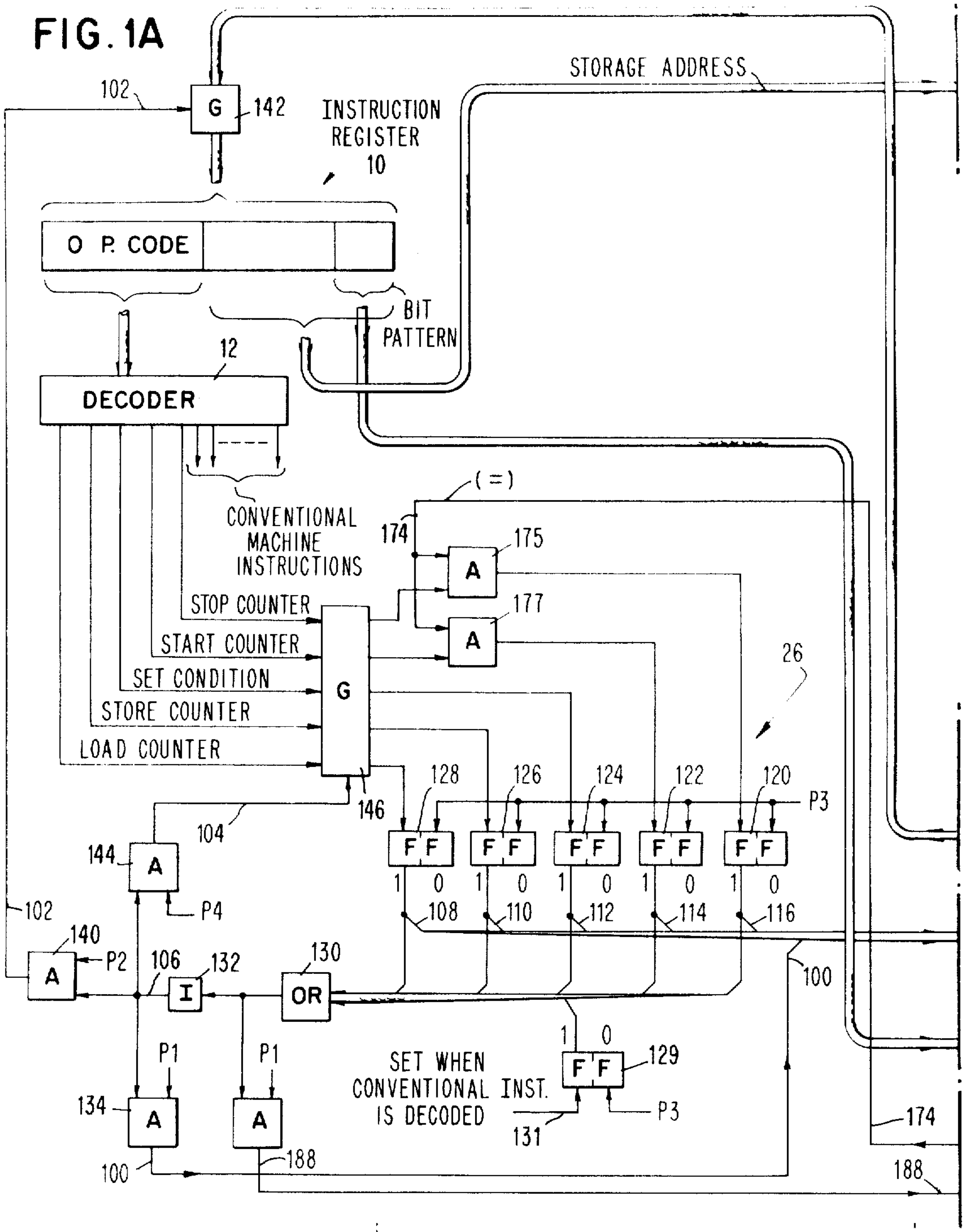
FIGS. 1A–1C comprise a combination functional block and logical schematic diagram wherein larger, well known components of the system are shown in functional block form and wherein the special purpose control hardware of the present invention is shown in logical schematic form.

According to the teachings of the present invention the counter is loaded and its contents are stored by specific instructions in an extended instruction set utilized by the system. A further additional instruction loads a particular bit configuration into the condition register from some predesignated and specific storage cell usually located in main memory. Finally, a specific pair of instructions is utilized to START and STOP the clock over a specified timing interval. In the following description, clock and counter are used interchangeably but refer to the same functional unit, i.e., the counter 156 of FIG. 1B. The following Table I illustrates the physical construction or configuration of these five special instructions. It will be noted that the left-hand portion contains the conventional OP code which tells the system just what operation is to be performed and which is conventionally determined by suitable instruction decoders as are well known in the art. The right-hand portion of the first three instructions contains memory addresses whose function is to either designate the location of the particular word in memory which is to be accessed or in the case of the "store clock" instruction designates the location in which a particular piece of information is to be stored. In the case of the last two mentioned instructions, the "start clock" and the "stop clock" instructions, it will be noted that the extreme right-hand portion of the address section contains a designated bit pattern. As will be set forth subsequently, the same bit pattern is utilized as a key or identification pattern which key is placed in a condition word. This condition word is subsequently loaded into the condition register. By means of this key a particular "start clock" and "stop clock" instruction may or may not be executed depending upon whether or not a match occurs.

TABLE I

Instructions of the extended set

| | | | |
|---|---|---|---|
| LOAD CLOCK | OP. CODE | | STORAGE ADDR.* |
| | Load contents of storage into clock | | |
| STORE CLOCK | OP. CODE | | STORAGE ADDR.* |
| | Stores contents of clock into storage at address | | |
| SET CONDITION | OP. CODE | | STORAGE ADDR.* |
| | Loads contents of storage into condition register | | |
| START CLOCK | OP. CODE | ////// | BIT PATTERN |
| | Starts clock if bit pattern matches field in condition register, else no-op. | | |
| STOP CLOCK | OP. CODE | ////// | BIT PATTERN |
| | Stops clock if bit pattern matches field in condition register, else no-op. | | |

*Could be an effective address as a result of indexing, base addressing, etc.

It will be noted from the above discussion that essentially the first three instructions of the "load clock" and "set condition" instruction load both the counter and the condition register and that the other instructions and "store clock" causes a storage of the final counter to be placed back in memory. These are, in essence, enabling instructions which must be utilized for the system to operate properly. However, the two instructions "start clock" and "stop clock" actually control the operation of the disclosed hardware to, in effect, count occurrences. As set forth previously, the "start clock" enables a flip-flop which allows the counter to be incremented or conversely disables the flip-flop which prevents the counter from being incremented.

The other major component of the system as set forth previously is the condition register. While the effect of the various bits allowed in this register may be somewhat arbitrary, basically the condition register contains two sections. First there is an actual condition section which specifies those conditions which are to be monitored. The second section, which may be called the identification section, contains a bit pattern which, as stated previously, is compared with an appropriate bit pattern in the "start clock" and "stop clock" instructions to determine if a particular machine interval is to be monitored by the timing mechanism.

Table II, which follows, is primarily exemplary in nature and illustrates a number of different cycles and/or modes which may be concurrently monitored during a given timing cycle. This is accomplished by setting respective bit locations of the condition word to 1's.

It should be understood that the meaning of the various bits is quite arbitrary and may be designed in any convenient manner which will, in the opinion of the designers, result in the most convenient usage. It is believed that the meaning of the Table II is self-explanatory with the additional statement that the indicated right-hand portion of the condition word contains the identifying bit pattern which is compared with a similar bit pattern included with both the "stop clock" and "start clock" instructions as described previously. It is these identifying bits which actually control the operation of the timing mechanism and which will at the time of their execution, act as "No Operations" for the particular "start" and "stop clock" instruction except if the aforementioned bit pattern matches the bit pattern in the low order position of the instructions themselves.

Suppose, for example, that a certain program run is being entered during which it is desired to measure the number of instructions executed in a given series of program steps associated with performing say an error handling operation. Also assume that at the same time it is desired to know the number of instructions executed in the mapping mode with a particular data channel also operating. By referring to Table II, it will be noted that in the portion of the condition register indicated as "cycles" a specific bit location referring to instruction execution would be set to a 1 where the others would be 0's.

TABLE II

| CYCLES | MODES | IDENTIFYING BIT PATTERN |
|---|---|---|
| 012 . . . | 012 . . . | |

Condition Register Contents:

Cycles
- 0 Instruction Fetch
- 1 Execution
- 2 Operand Fetch
- 3 Mapping (If Paging Machine)

Modes
- 0 Problem
- 1 SV
- 2 Mapping
- 3 Not Mapping
- 4 Priviledged
- 5 Not Priviledged
- 6 High Speed Memory
- 7 Low Speed Memory
- 8 Channel A on
- 9 Channel B on
- 10
- .
- . etc.
- .

Bit Pattern
Low Order Bits of START/STOP Instruction Will Be Matched Against This.

It should be noted at this point that in the cycle portion only one of these bits would normally be set. However, more than one bit could be set if it is appreciated that it would not be possible to sort out the final count unless additional relatively complex logical circuitry were added to the counting controls. In order to accomplish the other specified monitoring operations the bits selected would normally be in the "mode" section as indicated in Table II. Referring to Table II for the meaning of different bit positions, (as an example only) the desired bit locations would be set in order to accomplish the desired monitoring. As will be set forth subsequently, the contents of the various bit locations of the condition register are logically combined, usually by ANDing with particular lines coming from the computer which are conventionally present as will be also described subsequently so that the concurrent appearance of the signal from the output of the condition register together with a signal pulse appearing on the computer control line will cause a logical output from the AND circuit which in turn may be utilized to increment the counter or, if desired, could be further logically combined with other condition word specified occurrences for further ANDing/ORing, EXCLUSIVE ORing, etc.

To briefly reiterate the general operation of the system at the beginning of the program run, the contents of the counter must be loaded with all 0's. Also, the condition register is loaded with the desired bit pattern including the identifying bit pattern for the particular program segment which is to be monitored. At this point it will be noted that the identifying bit pattern for the "start clock" and "stop clock" instructions in the desired segment to be monitored must be known and appropriately loaded into the condition register. Finally, a "start clock" operation is encountered during the program run such that the instruction's low order bits correspond to the low order bits of the condition register. At this point specified conditions (from condition word) occuring in the system will cause the counter or clock to be incremented and this will continue until the appropriate STOP clock signal is encountered and a readout of the clock contents thus completes the measurement.

It should be noted, at this point that after a particular START clock instruction has been encountered other STOP clocks could be encountered which would not deactivate the system if the proper bit pattern were not detected. Thus, considerable flexibility in overlap of the timing intervals is possible without any degradation of performance on the part of the machine. As stated previously, it is quite possible that there will be various groups of functions to be measured in a particular program run and correspondingly a number of different timing intervals desired over an entire program. With the flexibility of the present system individual START and STOP instructions may have distinctive bit patterns in their low order fields and depending upon which particular interval it is desired to measure in the program, at start of run time, the appropriate values may readily be loaded into the condition register. Thus, the only change required of the programmer is the particular bit pattern which must be set in the condition register at program initialization time.

In measurement situations where program paths are to be measured, this is a great advantage since, without this particular facility, a recompilation or reassembly of the entire program would be needed or else manual settings of many individual instructions are mandatory. It is, of course, to be noted that the programmer must know where the various timing interval instructions are located in the program and their respective bit identifying patterns.

In the present invention it is possible to place the aforementioned START/STOP instructions with distinct values in their low order fields in a large number of strategic locations carefully placed at the time of the design of the programming system thus retaining a measurement potential permanently built in. Any time it is desired to completely ignore all of the timing mechanism instructions, one could, for example, load all 0's into the low order bits of the condition register. This would cause all START/STOP operations to act as "No. Op's." or be ignored. However, if it is desired to measure any particular combination of modes, paths, cycles, etc. at program initialization time, one only has to set the proper bit identifying pattern and set the desired condition bits and at the end of the run the count of the specified events will be available.

The disclosed embodiment of the invention will now be specifically described with reference to the FIGS. which disclose a combination logical block and functional schematic diagrams together with a chart of the underlying pulses utilized in the system.

It should be clearly understood that the disclosed embodiment, while preferred is, in essence, intended to be exemplary as many modifications to the system could readily be made without departing from the spirit and scope of the invention. As the description of the embodiment proceeds, certain of these alternatives will be briefly mentioned.

The disclosed embodiment is designed to execute the five special instructions disclosed and described with respect to Table I. These five instructions are believed to be necessary to such a system although it will be apparent that other additional instructions could be utilized to give additional aspects of control. The actual timing mechanism is generally described herein as a counter although in different terminology it might be called a clock since it is in essence driven by the underlying system clock which drives all of the computer.

Figure 2:
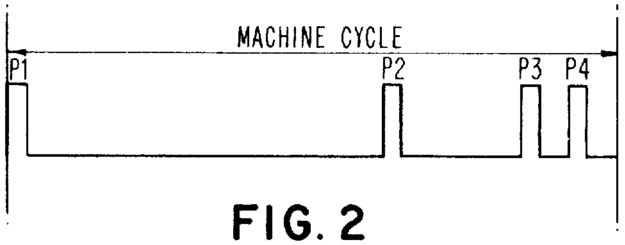
FIG. 2 comprises a timing chart for the system clock utilized to control the operation of the disclosed timing mechanism.

Referring to the diagram in FIG. 2, four clock pulses are shown during a single machine cycle. These pulses P1, P2, P3 and P4 are used both for instruction fetches and for the execution of instructions.

In the present embodiment it is assumed that an "instruction fetch" cycle is followed by an "execution cycle" unless the instruction turns out to be a "No. Op." After an "execution" cycle an "instruction fetch" cycle follows. In a conventional computer it is possible for several "execution" cycles to follow a single "instruction fetch" cycle. In the present embodiment it is assumed that only one "execution" cycle follows an "instruction fetch" cycle, for ease of explanation. The remainder of the description will refer to the combination logical and function schematic diagrams of the FIGS. 1A-1C. However, since the composite diagram is not overly complicated when a reference to FIG. 1 is made, it will be understood that FIG. 1 refers to the composite of FIGS. 1A-1C.

Figure 1:
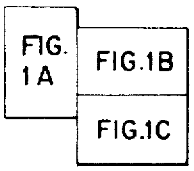
FIG. 1 comprises an organizational drawing for FIGS. 1A–1C.
Figure 1B:
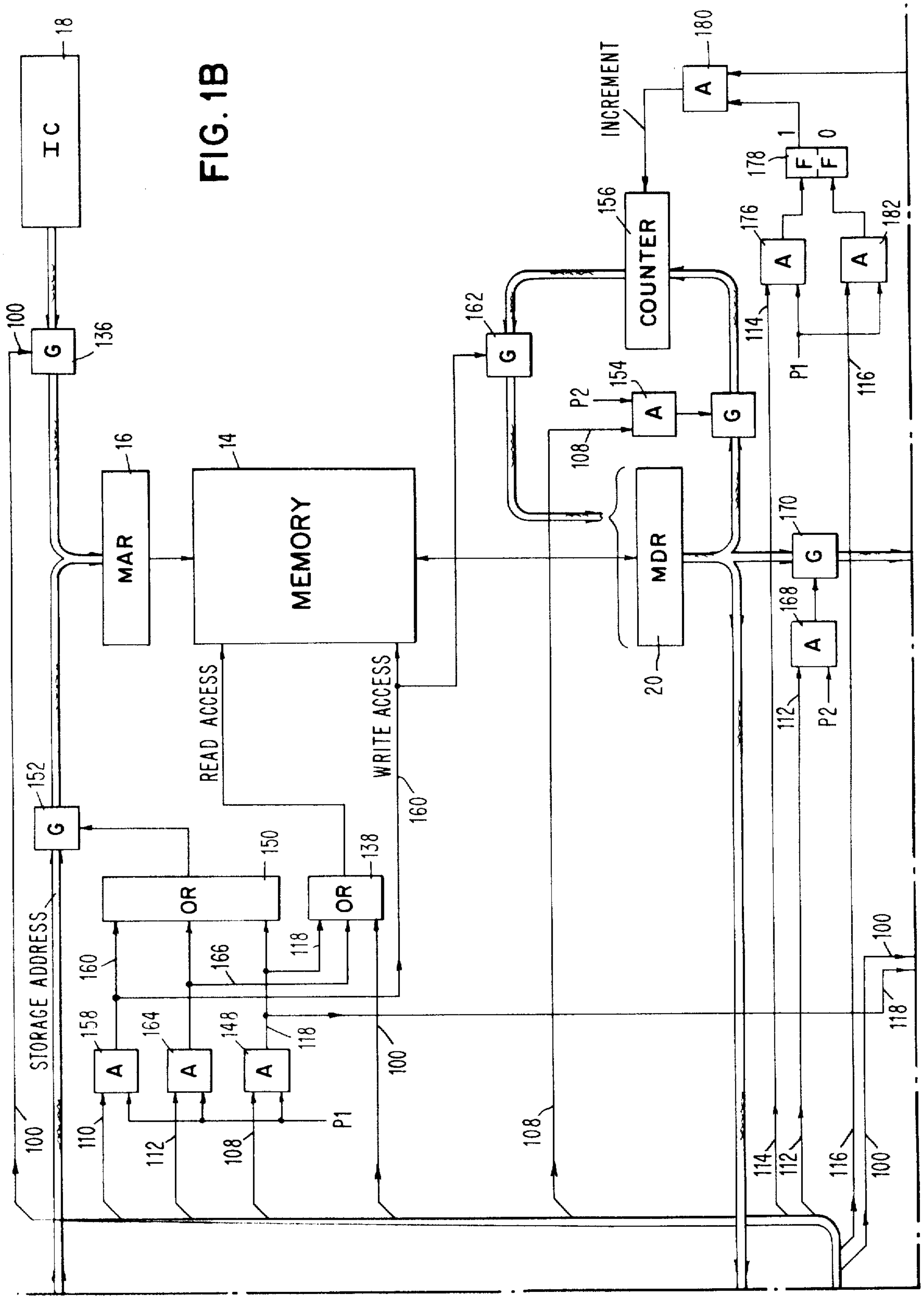

Referring now to the diagram of FIG. 1, it should be noted that the instruction register 10, the instruction decoder 12, the main memory 14, its associated memory address register 16 and memory gate register 20 together with the instruction counter 18 are essentially conventional with any computing system, the exception being, of course, that the instruction decoder 12 must have the ability to decode the extended instruction set including the various "stop clock," "start clock," "set condition," "store counter" and "load counter" instructions which will be encountered in the instruction set of the machine. It will be noted that the condition register 22 is located below the memory data register 20 and it is this register which is loaded with a special condition word which essentially controls the operation of the present timing mechanism. A set of AND circuits designated generally as 24 is connected to the various bit storage locations of the condition register 22 and when additional pulses appear on the various secondary input lines to these AND circuits an output pulse will be produced which passes through the large OR circuit to, in effect, increment the counter 156. It is this counter which together with the condition register 22 comprises the two primary additional function units necessary with the present invention. The five flip-flops designated as 26 located adjacent to the instruction decoder 12 are utilized for various control purposes as will be set forth subsequently. The decoder itdentifies the special instructions utilized with the present system.

Referring now to the specific operation of the system it will be noted that if the five flip-flops 120, 122, 124, 126 and 128 are all in their 0 state, the OR circuit 130 will not have an output and therefore the INVERTER 132 will have an output on line 106. The active state of line 106 will enable the AND circuit 134 and, when the P1 pulse occurs, line 100 will be active. Line 100 extends to GATE 136 and the pulse on it gates the contents of the instruction counter 18 to the memory address register 16.

Line 100 also extends to OR circuit 138 and the pulse on it causes a "read" access of memory 14. The instruction obtained from memory is automatically placed in the memory data register (MDR) 20. The active state of line 106 also enables AND circuit 140 which allows pulse P2 to appear on line 102. Line 102 extends to GATE 142 where the pulse on it gates the contents of the memory data register 20 to the instruction register 10. The active state of wire 106 enables AND circuit 144 thus allowing pulse P4 to appear on wire 104. Wire 104 extends to GATE 146 and the pulse on it samples the instruction decoder 12. Enabling of the GATE 146 may result in setting one of the flip-flops 120 through 128, inclusive, to its 1 state. It will be noted that the P3 pulse resets any one of these flip-flops that was previously in its 1 state. In this manner an "instruction fetch" is performed and the proper flip-flop 120–128 is set to its 1 state if an appropriate timing mechanism instruction is encountered in the instruction decoder 12.

If no flip-flop in the 120–128 group is set to its 1 state, the instruction is called a "No-Op" and another "instruction fetch" cycle will follow.

If any one of the flip-flops 120–128 is in its 1 state, OR circuit 130 will have an output and the line 106 will not be active. In this manner an "instruction fetch" cycle is inhibited. It should be noted that if a conventional instruction is detected by the decoder 12, flip-flop 129 will be set by line 131 to allow for the handling of normal machine instructions.

There will now follow a description of the operation of the disclosed embodiment in accordance with the detection of the five specified special instructions which initiate and terminate operation of the present timing mechanism.

The execution of the "Load Counter" instruction will first be described. With flip-flop 128 in its 1 state, line 108 will be active. The active state of line 108 enables the AND circuit 148 thus permitting the P1 pulse to extend through the OR circuit 150 and be applied to gate 152. This gates the address portion of the IR 10 to the MSR 16. The P1 pulse also extends via wire 118 and OR circuit 138 to request a "read" access of the MEMORY 14. The word selected from storage is placed in the MDR 20. The active state of wire 108 enables the AND circuit 154 and when the P2 pulse occurs, the contents of the MDR 20 is gated to the counter 156. The P3 pulse resets flip-flop 128 so the next cycle will automatically be an "instruction fetch" cycle.

The execution of the "Store Counter" instruction will next be described. Line 110 will be active because flip-flop 126 is in its 1 state. AND circuit 158 will be enabled allowing wire 160 to become active when the P1 pulse occurs. The active state of wire 160 is applied to GATE 162 in order to gate the contents of the counter 156 to the MDR and also to GATE 152 in order to gate the storage address to the MAR. The active state of wire 160 also requests a "write" access. When the P3 pulse occurs, flip-flop 126 is reset.

The execution of the "Set Condition" instruction will next be described. Line 112 will be active because flip-flop 124 is in its 1 state. AND circuit 164 will be enabled, allowing the P1 pulse to extend through OR circuit 150 to GATE 152 in order to gate the address portion of the IR 10 (the desired condition word) to the MAR 16. The P1 pulse will also appear on wire 166 in order to request a "read" access. After the word appears in the MDR, the P2 pulse is applied to AND circuit 168 which is enabled by the active state of wire 112. The P2 pulse thus extends to GATE 170 in order to gate the contents of the MDR to the Condition Register.

The execution of the "Start Counter" instruction will next be described. This instruction will be a "No-Op" if the bit pattern in the IR does not agree with the bit pattern in the condition register. It will be noted that flip-flop 122 cannot be set to 1 unless the compare unit 172 has an output on line 174 which provides one input to the two AND circuits 175 and 177. If flip-flop 122 is set to 1, line 114 will be active and AND circuit 176 will be enabled. When the P1 pulse occurs, it will be effective to set flip-flop 178 to its 1 state. This will cause AND circuit 180 to be enabled and thus permit the counter 156 to be incremented.

The execution of the "Stop Counter" instruction will next be described. Flip-flop 120 cannot be set to 1 if the compare unit 172 does not have an output on wire 174 and partly enable AND circuits 175 and 177. If flip-flop 120 is set to 1, wire 116 will be active and AND circuit 182 will be enabled allowing the P1 pulse to reset flip-flop 178 to its 0 state. With flip-flop 178 in its 0 state incrementing of the counter is inhibited.

As set forth previously in the disclosure, events occurring in the computing system can be counted if the appropriate bit in the condition register 22 is set. For example, if the left-most bit of the condition register is set to 1 AND circuit 184 is partially enabled and subsequently any pulses appearing on line 100 which effectively gate the instruction counter into the memory address register can be counted. In the disclosed embodiment a pulse appears on line 100 every "instruction fetch" cycle. Thus, the pulses emanating from AND circuit 184 indicate each instruction fetch occurring during any specified clock period. It will be noted in the present embodiment that the only instructions illustrated as being fetched are the special purpose instructions. Therefore, in a conventional system, line 100 would have to be connected to the instruction counter gate at the proper point to count all instruction fetches.

Similarly, if the second left-most bit position of the condition register is set, then the AND circuit 186 is partially enabled. Subsequent pulses appearing on line 188 will then be counted. In the disclosed embodiment a pulse appears on line 188 each time an instruction is executed which is not a "No-Op."

Again, setting the third left-most bit position of condition register 22 partially enables AND circuit 190 wherein the pulses appearing on line 118 will be counted. In the present embodiment the pulses appearing on line 118 represent operand fetches for the present timing mechanism. To count any operand fetch in the system this line would obviously have to be connected to the instruction decoder so that all operand fetches for any machine instruction are detected and counted.

Figure 1C:
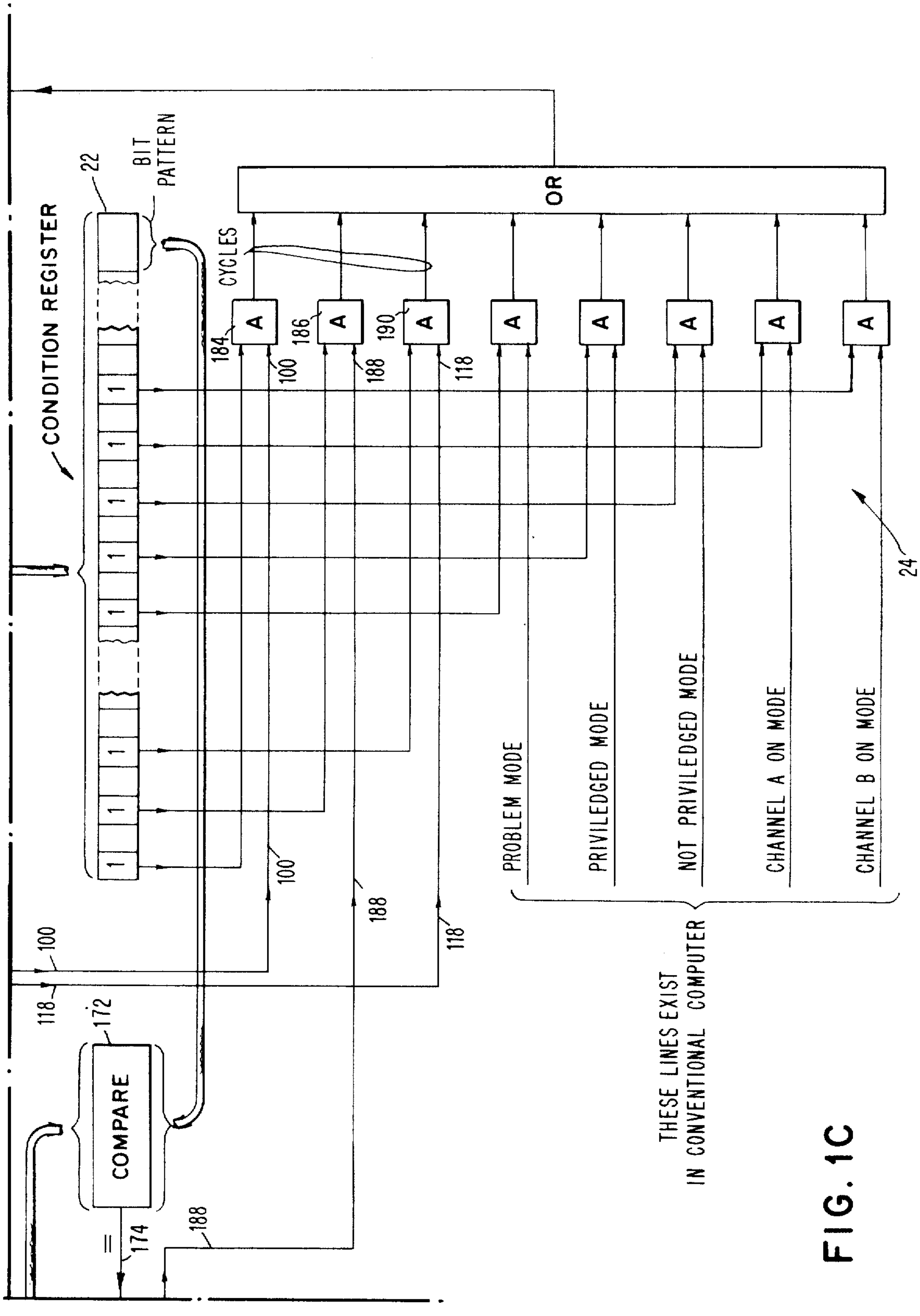

The other lines at the bottom of FIG. 1C provides inputs to the last five AND circuits in the group designated by numeral 24 illustrate other specific lines which are activated in the computer at least once every machine cycle assuming the designated modes are active in the system.

It will be readily appreciated that the above-described embodiment is essentially exemplary in nature and that a number of modifications could readily be made to the overall system without departing from the essential aspects of the invention; namely, a system wherein the timing intervals are embedded within the program and wherein the actual timing hardware specifically dedicated to the timing function is built within the system and is actuated when certain conditions are set into the system by the programmer or which may be otherwise ignored.

For example, more than one counter could be designed into the system with a separate condition register for each count whereby different conditions in different timing intervals could be concurrently monitored. Also, considerably more complex logic could be associated with the condition register. For example, the condition register could be broken up into segments which may be selectively ANDed or ORed together as required.

While the disclosed embodiment in essence counts occurrences, the manner in which occurrences are counted namely, measuring a single pulse per machine cycle, these counts may be automatically converted into time and insofar as a comparative measurement is concerned, the count may be compared with, for example, an overall machine count. Alternatively, comparisons may be made of different conditions on subsequent runs of the program by appropriately setting the condition words on such subsequent runs.

It is believed that the above description of the present invention will allow those skilled in the art to practice same for the purpose of monitoring any desired occurrences in an electronic computing system providing of course that the specific signals are available within the system.

What is claimed is:

1. A timing mechanism for registering the occurrence of certain specified events in an electronic computing system one at a time wherein said system includes a main memory, a central processing unit, an instruction unit including an instruction register and data channels, said timing mechanism including:

a counter, means for initializing said counter, means for storing the current contents of said counter, a condition register, means for loading said condition register with data indicative of the type of occurrences it is desired to monitor, said means for loading being independent of and without in any way altering the program whose performance is being monitored, means for loading said condition register with data indicative of a specified, predetermined sequence of operation of said system, means operative under control of said condition register for incrementing said counter when a specified event occurs during a specified sequence of operation of said system.

2. A timing mechanism as set forth in claim 1 including means for determining if a particular sequence of instructions is to be monitored of said said timing mechanism.

3. A timing mechanism as set forth in claim 2 wherein said last-named means includes a compare circuit connected to a first identification field portion of both said condition register and said instruction register for determining if the two identifying fields are the same, and that the immediately succeeding instructions are to be monitored, logic means connected to a second field portion of said condition register and, means connecting said logic means to selected control lines of said computing system, said control lines being characterized by a pulse appearing thereon during each machine cycle that the particular control line is active.

4. In an electronic computing system including a main memory, a central processing unit, an instruction unit, data channels, and a timing mechanism including a counter which may be incremented only during the occurrence of conditions specified by a condition register and during an interval of operation of the system specified by the program being run on the system, a method of monitoring the operation of said system including the steps of:

loading said condition register, determining if a point in the instruction stream specified by the condition register has been reached, setting the counter to a specified initial condition, incrementing said counter at least once when a condition of operation of said system specified by said condition register is active, and storing the current contents of said counter when a second point in the instruction stream specified by said condition register is reached.

5. A method as set forth in claim 4 including the steps of loading said condition register, enabling said counter and subsequently storing the contents of said counter a predetermined number of times during a given program execution cycle specified by the instruction stream currently being run on the system.

6. A method as set forth in claim 4 including the step of incrementing said counter in accordance with system clock pulses when the condition of operation of the system specified by the condition register is active.

* * * * *

PO-1050
(5/69)

UNITED STATES PATENT OFFICE
CERTIFICATE OF CORRECTION

Patent No. 3,771,144 Dated November 6, 1973

Inventor(s) L. A. Belady, W. R. DeOrazio and R. W. O'Neill

It is certified that error appears in the above-identified patent and that said Letters Patent are hereby corrected as shown below:

Column 11, line 30, Change "of said said" to -- by said --

Signed and sealed this 21st day of May 1974.

(SEAL)
Attest:

EDWARD M.FLETCHER, JR.
Attesting Officer

C. MARSHALL DANN
Commissioner of Patents